March 8, 1927.

H. D. MORGAN ET AL 1,619,878

DOSAGE SPOON

Filed Nov. 13, 1924

INVENTORS
H. D. MORGAN
F. P. BUSHEY
BY
ATTYS

Patented Mar. 8, 1927.

1,619,878

UNITED STATES PATENT OFFICE.

HARRY D. MORGAN AND FRANKLIN P. BUSHEY, OF SAN FRANCISCO, CALIFORNIA; SAID BUSHEY ASSIGNOR TO SAID MORGAN.

DOSAGE SPOON.

Application filed November 13, 1924. Serial No. 749,592.

This invention resides in the provision of a spoon which is especially designed to permit of the administering of doses of medicine in an easier, more convenient and more accurate manner than is possible with the ordinary spoon.

One of the purposes of the invention is to provide a dosage spoon of the character described in which the bowl of the spoon has its longitudinal axis extending substantially at right angles to a comparatively short handle that has a convenient grip portion and is constructed so that the bowl will sit level and not be subject to tipping over when the spoon is laid on a table or like support. The arrangement of the bowl with respect to the handle provides for an easier and more convenient application of the spoon to the mouth of the patient in administering the dose.
The grip portion on the handle makes possible an easy and convenient picking up and a steady holding of the spoon whereby spilling of the contents of the bowl is prevented. The level stand of the bowl when laid on a table or like support, provides for a more accurate measurement of a dose of medicine and prevents spilling or waste of the medicine in pouring out doses into the spoon.
Another purpose of the invention is to provide a spoon of the character described in which there is provided at a convenient point on the handle, an indicator that may be readily operated to indicate the time for taking the next dose, said indicator being preferably mounted adjacent to the outer end of the handle, which end is bent downward to act as a leg for supporting the handle so that the bowl will have a level stand.
A further purpose is to provide a spoon of the character described in which the grip portion depending from the handle at a point between the ends of the latter in addition to providing for an easier and steadier handling of the spoon and for reinforcing the spoon as a whole, also acts as a support together with the down turned support at the outer end of the handle and therefore insures a steady level stand of the bowl and spoon as a whole, the lowermost side of the bowl, the outer end of the handle and the lower edge of the grip portion being in approximately the same horizontal plane.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawing.

Figure 1:
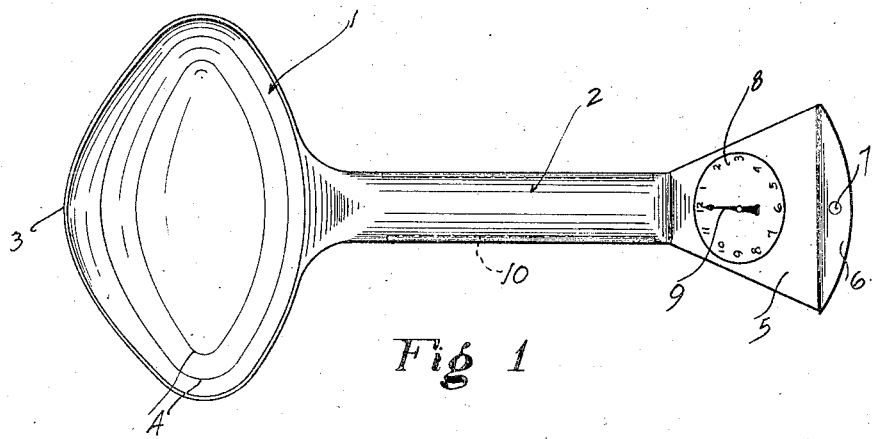
Fig. 1 represents a top plan view of the spoon of our invention.
Figure 2:
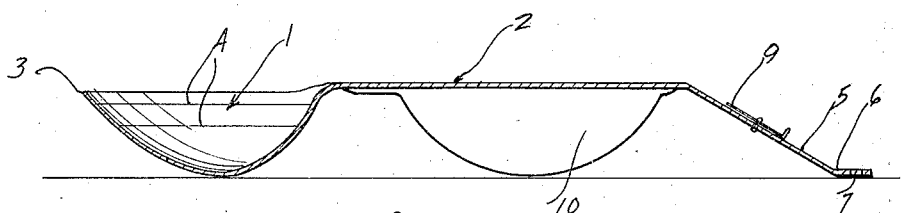
Fig. 2 represents a longitudinal sectional view of the spoon.
Figure 3:
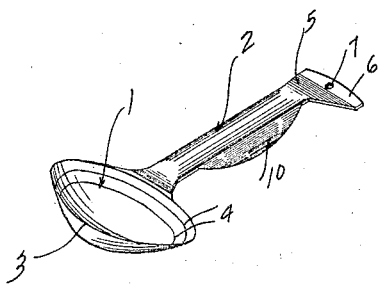
Fig. 3 represents a perspective view of the spoon with the indicator removed.

The spoon of the invention shown in the accompanying drawing comprises an ovicular bowl 1, which has its greater length extending in a direction approximately at right angles to a short handle 2. This provides for a ready application of either end of the bowl to the mouth and makes possible an easy and convenient administering of a dose of medicine. The front side of the bowl is extended slightly and so shaped as to provide a lip 3 which may be used in preference to the ends of the bowl if desired. This bowl having three lips, the portion 3 and the two ends, insures an easy, quick and accurate administering of doses of medicine and eliminates likelihood of spilling of the contents of the bowl. The inside of the bowl is graduated by rings 4, designating different measures.

The handle 2 extends straight out from the upper edge and centrally of the ends of the bowl to a point near its outer end where it is laterally flared or enlarged as at 5, and said enlarged portion is first bent downward and outward and then straightened at its outer extremity to provide a flat foot portion 6. An opening 7 is provided in the portion 6 to permit of hanging the spoon on a hook or nail, not shown. The portion 6 is disposed in approximately the same horizontal plane as the lowermost side of the bowl and provides for a level stand of the bowl and spoon as a whole, when the spoon is placed on a table or like support. By having the length of the bowl extend at right angles to the handle, a longer supporting surface is provided on the bottom of the bowl and extends on opposite sides of the handle so as to provide for a balanced, steady and level stand of the spoon when placed on a table or support. This is augmented by the fan shaped end of the handle being bent downward to act as a support.

We may provide an indicator on the enlarged inclined portion of the handle, this being a convenient location for the indicator. The indicator comprises a clock face 8 and a rotatable pointer 9. The indicator as shown, will serve as a reminder as to the time for taking the next dose.

The spoon is adapted to be picked up and held by grasping the handle at a point between its ends so that either end of the bowl of the spoon may be readily applied to the mouth, and furthermore so that a steadier hold on the spoon may be maintained. The handle is therefore provided with spaced depending flanges 10 which serve as grip portions, reinforce the spoon and also act as supports inasmuch as the lower edges of said flanges are adapted to engage the table or support on which the spoon is placed. These flanges are located between the ends of the handle and extend straight down from the sides of the handle. They may be curved on their lower edges as shown. The flanges or grip portions act as braces and prevent bending of the spoon in case the latter is stepped upon or some heavy object is rested or placed on the handle. The wide flanges serving as grip portions insure a steady gripping and holding of the spoon.

We claim:

1. A spoon comprising a bowl and a handle, said handle having its outer extremity bent downward to serve as a supporting leg, the lower extremity of which leg is disposed in substantially the same horizontal plane as the lower side of the bowl and flanges depending from the handle intermediate of its ends and serving as a grip portion.

2. A spoon comprising a bowl and a handle in which the bowl has its longitudinal axis extending at substantially right angles to the longitudinal axis of the handle, said handle having its outer extremity bent downward to serve as a supporting leg, the lower extremity of which leg is disposed in substantially the same horizontal plane as the lower side of the bowl and flanges depending from the handle intermediate of its ends and serving as a grip portion, the lower edges of said flanges being in substantially the same plane as the lower edges of the leg and bottom of the bowl.

3. A spoon comprising a bowl and handle in which the bowl has its longitudinal axis extending substantially at right angles to the longitudinal axis of the handle, said handle having its outer end laterally enlarged and inclined downwardly and outwardly so that its lower end is in substantially the same horizontal plane as the bottom of the bowl and flanges depending from the handle intermediate the ends thereof.

4. A spoon comprising a bowl, a handle extending from the bowl, said handle having its outer end enlarged and extended downward to act as a support, the lower end of the downwardly extended portion being disposed in approximately the same horizontal plane as the lower side of the bowl whereby the bowl of the spoon will have a level stand when rested on a table or like support and a grip portion depending from the handle intermediate of the ends thereof.

5. A spoon comprising a bowl, a handle extending from the bowl, portions extending downwardly from the handle and serving as supports, the lower edges of which are disposed in approximately the same horizontal plane as the bottom of the bowl, an enlarged portion on said handle and an indicator provided on said enlarged portion, which indicator includes a rotatable pointer.

6. A spoon comprising an ovicular bowl, a handle extending outwardly from the ovicular bowl at a point intermediate the ends of the bowl, portions extending downwardly from the handle and acting as supports to engage a table or like surface on which the spoon is placed, one of said portions being laterally enlarged.

7. A spoon comprising an ovicular bowl, a handle extending outwardly from a point approximately centrally of the ends of the bowl, the outer end of said handle being inclined outwardly and downwardly and laterally enlarged, and having its lower extremity bent to provide a flat foot portion, and flanges extending downwardly from opposite edges of the handle at a point intermediate of the ends of the latter.

8. A spoon comprising an ovicular bowl, a handle extending outwardly from the bowl, the outer end of said handle being inclined outwardly and downwardly and laterally enlarged, and having its lower extremity bent to provide a flat foot portion, and flanges extending downwardly from opposite edges of the handle at a point intermediate of the ends of the latter, the lower edges of which flanges are disposed to engage the table or support on which the spoon is placed.

HARRY D. MORGAN.
FRANKLIN P. BUSHEY.